United States Patent [19]

Hayama

[11] 4,317,443
[45] Mar. 2, 1982

[54] SOLAR HOUSE

[76] Inventor: Masaru Hayama, 1296-5, Takimiya, Ryonan-cho, Ayauta-gun, Kagawa-ken, Japan

[21] Appl. No.: 83,931

[22] Filed: Oct. 11, 1979

[30] Foreign Application Priority Data

Oct. 11, 1978 [JP]  Japan ................................ 53-125591

[51] Int. Cl.³ ............................................... F24J 3/02
[52] U.S. Cl. .................................... 126/429; 126/431; 98/31
[58] Field of Search ............... 126/429, 432, 450, 431; 34/93; 98/31

[56] References Cited

U.S. PATENT DOCUMENTS 4,197,993  4/1980  Trombe et al. ..................... 126/429
4,237,865 12/1980  Lorenz ............................. 126/429

Primary Examiner—Carroll B. Dority, Jr.
Attorney, Agent, or Firm—Wenderoth, Lind & Ponack

[57] ABSTRACT

The invention is related to a solar house having an outer wall made of heat absorbing and transmitting material and an inner wall made of heat insulating material. An outer chamber is defined by the area between the outer and inner wall and an inner chamber is defined by the area within the inner wall. By closing and opening a passageway between the ambient and the outer chamber, the direction and path of a convection air current is regulated so as to produce a cooling effect in warm weather and a heating effect in cool weather.

4 Claims, 3 Drawing Figures

4,317,443

SOLAR HOUSE

BACKGROUND AND SUMMARY OF THE INVENTION

The present invention is related to a solar house which can be cool in summer and kept warm in winter with out energy such as electricity or petrol.

A conventional structure such as a drying house or a workhouse requires cooling facilities in the summer to cool and heating facilities in the winter to warm. Such cooling and heating facilities are expensive to install and, due to the high cost of energy, costly to operate, especially if the structure is relatively large.

An object of the present invention is to provide a solar house or structure which is inexpensive to manufacture and yet functions effectively to heat and cool the inside area thereof.

BRIEF DESCRIPTION OF THE FIGURES

Other features and advantages of this invention will become apparent from the following description taken with reference to the accompanying drawings, in which.

DETAILED DESCRIPTION OF THE PREFERRED EMBODIMENT

Figure 1:
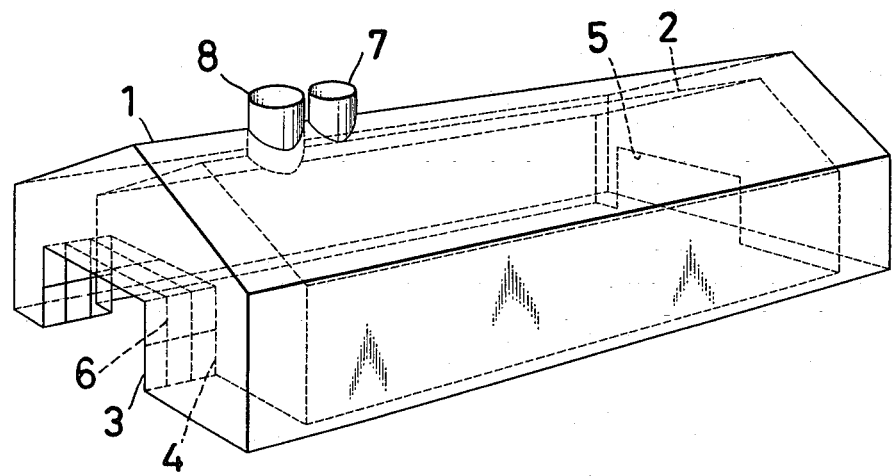
FIG. 1 is a perspective view of the preferred embodiment of a solar house according to the present invention.

Referring to FIG. 1, a solar house according to this invention comprises an outer wall 1 defining an outer wall of an outer chamber and an inner wall 2 defining the inner wall of the outer chamber and defining an inner chamber therein. The outer wall has a front opening 3 and the inner wall 2 has a front opening 4 aligned with the opening 3 in the outer wall. A passage is defined from the opening 3 of the outer wall 1 to the front opening 4 of the inner wall 2 and is peripherally enclosed at its top and sides by heat-insulating plates 6 which are removably mounted on a frame.

The inner wall 2 has a rear opening 5 in the side opposite to the front opening 4. The outer and inner walls are provided with air vents 7 and 8, respectively, which can be closed when necessary.

The outer wall is made of a material which can readily absorb and transmit the heat of the sun, such as a synthetic resin or a metal plate, which should preferably be transparent, black or substantially black. The inner wall is made of a heat-insulating material, for example, urethane, foamed styrol, or glass wool, which is bonded to wooden plates.

Both the inner and outer chambers should be fully enclosed so as not to allow air to enter except through the openings.

The outer wall may be provided with a rear opening as well as the front one, if desired. The number of the openings may be increased with the area of each opening being decreased such that the total area of openings remains substantially the same. All of the openings should preferably be adapted so as to allow the adjustment of their respective area.

Figure 2:
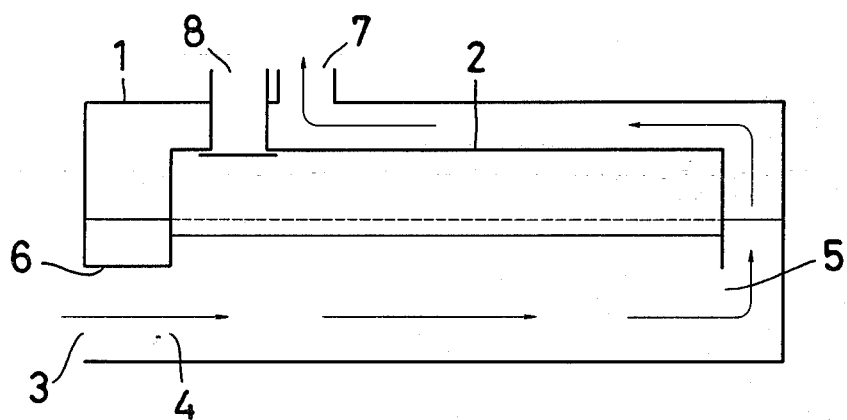
FIG. 2 is a vertical sectional illustration of the preferred embodiment showing air flow therethrough during summer weather.

As shown in FIG. 2, in summer type weather, the solar house according to the present invention is used with the air vent 8 of the inner wall closed. Since the passage leading from the front opening 3 to the front opening 4 is enclosed by the heat-insulating plates 6, air does not flow directly into the space between the inner wall and the outer wall. The air in the space therebetween will be heated by the heat of the sun and subsequently discharged out through the air vent 7, and this air flow drafts air from the inner chamber through the rear opening 5. Thus, outside air will be drafted into the house through the front openings 3 and 4. This produces air flow through the solar house as illustrated in FIG. 2, such that the inner chamber is kept substantially cool.

Figure 3:
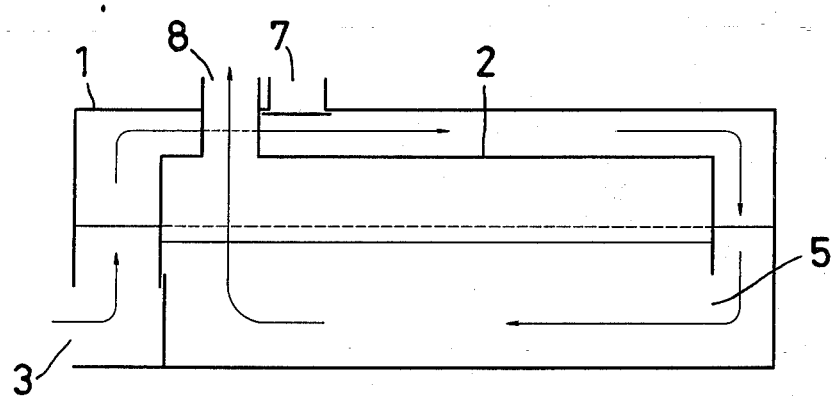
FIG. 3 is an illustration similar to that in FIG. 2 showing air flow therethrough during winter weather.

In winter weather, the solar house according to the present invention is used with the heat-insulating plates 6 removed and with the front opening 4 and the air vent 7 of the outer chamber closed. as shown in FIG. 3, the air in the space between the outer wall and the inner wall is heated by solar energy, flows down into the inner chamber through the rear opening 5 and is substantially discharged through the air vent 8 to the outside. Thus, a flow of warm air is produced through the outer chamber and the inner chamber. At night, by closing all the openings and the air vents, the inner chamber is kept warm because the inner wall 2 is made of heat-insulating material and because the house is of a double-wall construction as previously described.

The air vents should be large enough so as to assure the formation of a convection air current. If they are too small, there is a possibility of producing an air current in the reverse direction with respect to the direction of the normal convection air current.

It will be understood from the foregoing that the solar house according to this invention can be kept cool in summer and warm in winter without requiring energy for an air conditioner or petrol for a heater. The solar house according to this invention is inexpensive to manufacture because it can be assembled from mass-producible wall sections.

What I claim:

1. A solar house comprising:

an outer wall having a first opening in a lower portion of a side thereof communicating with the ambient;

an inner wall spaced inwardly from said outer wall and having at least a second and third opening, said second opening being located in a lower portion of a side of said inner wall and being substantially axially aligned with said first opening, said third opening being located in a lower portion of a side of said inner wall opposite said second opening an outer chamber being defined by a space between said outer and inner wall and extending to said first and second openings;

an inner chamber being defined by a space inside the inner periphery of said inner wall;

a removable plate means removably disposed within said outer chamber for defining a passageway communicating with said first and second openings and for closing and opening direct communication between said first opening and said outer chamber in first and second phases of operation of said house, respectively a first vent means in an upper location of said outer wall for communicating said outer chamber with the ambient in said first phase of operation of said house; first removable closure means for closing said first vent means in a second phase of operation of said house;

a second vent means for communicating said inner chamber with the ambient second removable closure means for closing said second vent means in said first phase of operation of said house; and third removable closure means for closing said second opening in the second phase of operation of said house.

2. A solar house as claimed in claim 1, wherein said outer wall comprises a heat absorbing material.

3. A solar house as claimed in claim 1, wherein said inner wall comprises a heat insulating material.

4. A solar house as claimed in claim 1, wherein said removable plate means is removably mounted on a frame means and is comprised of a heat insulating material.

* * * * *